United States Patent
Meki

(10) Patent No.: US 9,591,172 B2
(45) Date of Patent: Mar. 7, 2017

(54) INFORMATION READING APPARATUS AND COMPUTER-READABLE STORAGE MEDIUM

(71) Applicant: CASIO COMPUTER CO., LTD, Shibuya-ku (JP)

(72) Inventor: Masaharu Meki, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/804,844

(22) Filed: Jul. 21, 2015

(65) Prior Publication Data

US 2015/0326747 A1    Nov. 12, 2015

Related U.S. Application Data

(63) Continuation of application No. 14/081,724, filed on Nov. 15, 2013, now Pat. No. 9,131,124.

(30) Foreign Application Priority Data

Dec. 18, 2012 (JP) ................... 2012-275308

(51) Int. Cl.
  *H04N 1/04* (2006.01)
  *H04N 1/21* (2006.01)
  *H04N 1/195* (2006.01)

(52) U.S. Cl.
  CPC ......... *H04N 1/212* (2013.01); *H04N 1/19594* (2013.01); *H04N 2201/0067* (2013.01); *H04N 2201/0081* (2013.01); *H04N 2201/0434* (2013.01)

(58) Field of Classification Search
  CPC .................. H04N 1/19594; H04N 2201/0434
  USPC .................. 358/1.18, 403, 448, 474
  See application file for complete search history.

(56) References Cited

U.S. PATENT DOCUMENTS

| | | |
|---|---|---|
| 5,285,504 A | 2/1994 | Pavlidis et al. |
| 6,697,536 B1 | 2/2004 | Yamada |
| 8,503,045 B2 | 8/2013 | Kubo et al. |
| 9,131,124 B2 | 9/2015 | Meki |

(Continued)

FOREIGN PATENT DOCUMENTS

| | | |
|---|---|---|
| JP | 10-150535 | 6/1998 |
| JP | 2000-004390 | 1/2000 |

(Continued)

OTHER PUBLICATIONS

Office Action dated Oct. 25, 2016 which issued in the corresponding Japanese Patent Application No. 2015-105397.

*Primary Examiner* — Houshang Safaipour
(74) *Attorney, Agent, or Firm* — Cozen O'Connor

(57) ABSTRACT

An image control apparatus which stores in a storage section an image captured in an imaging section, comprising a comparing section which, after changing from a first static image in which an imaging subject is not in motion into a dynamic image in which the imaging subject is in motion and at a time when changing from the dynamic image into a second static image in which an imaging subject is not in motion, compares the first static image and the second static image; and a storage controlling section which controls whether or not to store the second static image in the storage section, in accordance with a comparison result of the comparing section.

7 Claims, 9 Drawing Sheets

(56) References Cited

U.S. PATENT DOCUMENTS

| | | | |
|---|---|---|---|
| 2005/0225805 A1* | 10/2005 | Kato | H04N 1/3875 |
| | | | 358/1.18 |
| 2009/0279789 A1 | 11/2009 | Malik et al. | |
| 2011/0102858 A1 | 5/2011 | Iguchi | |
| 2011/0299136 A1 | 12/2011 | Kubo et al. | |
| 2013/0250379 A1* | 9/2013 | Rigazio | H04N 1/19594 |
| | | | 358/538 |
| 2014/0168720 A1 | 6/2014 | Meki | |
| 2015/0326747 A1 | 11/2015 | Meki | |

FOREIGN PATENT DOCUMENTS

| | | |
|---|---|---|
| JP | 2000-308045 | 11/2000 |
| JP | 2001-197305 | 7/2001 |
| JP | 2003-219180 | 7/2003 |
| JP | 2007-282096 | 10/2007 |
| JP | 2011-254366 | 12/2011 |
| JP | 2012-011176 | 1/2012 |
| JP | 2012-065261 | 3/2012 |
| JP | 2014-120962 | 6/2014 |

\* cited by examiner

INFORMATION READING APPARATUS AND COMPUTER-READABLE STORAGE MEDIUM

CROSS-REFERENCE TO RELATED APPLICATION

This application is a continuation of U.S. application Ser. No. 14/081,724 filed Nov. 15, 2013 which claims the benefit of priority of Japanese Patent Application No. 2012-275308, filed Dec. 18, 2012, the entire content of all of which are incorporated herein by reference.

BACKGROUND OF THE INVENTION

1. Field of the Invention

The present invention relates to an image control method and apparatus for storing in a storage section an image captured in an imaging section.

2. Description of the Related Art

Conventionally, as a technology for sequentially imaging a book or the like and sequentially recording images of the book, a technology is known in which, when a book or the like is held by hand and pages of the book are sequentially turned, this page turning is detected by analyzing images obtained by sequentially imaging this state, and then the images of the respective pages are recorded and stored (refer to Japanese Patent Application Laid-Open (Kokai) Publication No. 2012-065261). Specifically, in the technology disclosed in Japanese Patent Application Laid-Open (Kokai) Publication No. 2012-065261, when a page is uninterruptedly turned, since the position of the page end side in captured images is uninterruptedly changed, change in the position of the page end side is detected. When it is detected based on the position of the page end side that the page has been completely turned, an image captured at this point is obtained, recorded, and stored as an image for one page.

However, with the method of the above-described technology where change in the position of a page end side is detected, although a page end side can be detected at a high-contrast portion, it is difficult to always stably detect a page end side. Also, a page end side may be confused with a folding portion (longitudinal center line) between the pages of a two-page spread, by which an erroneous detection regarding page turning may be occurred. Moreover, when each spread page is photographed, data for a two-page spread is recorded and stored as data for a single image.

SUMMARY OF THE INVENTION

One object of the present invention is to enable one page to be processed as one image even when an entire two-page spread of an information recording medium is photographed at one time.

In accordance with one aspect of the present invention, there is provided an information reading apparatus which photographs an information recording medium having information recorded thereon and reads the information, comprising: a judging section which judges whether the information recording medium is in a two-page spread layout by analyzing a photographed image of the information recording medium; and a dividing section which divides the photographed image of the information recording medium into pages of a two-page spread, when the judging section judges that the information recording medium is in a two-page spread layout.

In accordance with another aspect of the present invention, there is provided a non-transitory computer-readable storage medium having stored thereon a program that is executable by a computer, the program being executable by the computer to perform functions comprising: processing for judging whether an information recording medium having information recorded thereon is in a two-page spread layout by analyzing a photographed image of the information recording medium; and processing for dividing the photographed image of the information recording medium into pages of a two-page spread, when the information recording medium is judged to be in a two-page spread layout.

According to the present invention, one page can be processed as one image even when an entire two-page spread of an information recording medium is photographed at one time, whereby images obtained by sequentially imaging a book or the like can be efficiently processed for each page.

Another aspect of the present invention is directed to an image control apparatus which stores in a storage section an image captured in an imaging section, comprising: a comparing section which, after changing from a first static image in which an imaging subject is not in motion into a dynamic image in which the imaging subject is in motion and at a time when changing from the dynamic image into a second static image in which an imaging subject is not in motion, compares the first static image and the second static image; and a storage controlling section which controls whether or not to store the second static image in the storage section, in accordance with a comparison result of the comparing section.

Another aspect of the present invention is directed to an image control apparatus which stores in a storage section a captured image captured in an imaging section, comprising a detecting section which detects presence or absence of a change in images sequentially captured in the imaging section; a comparing section which, after a change in the images is detected in the detecting section and at a time when detected that a change in the images has ceased, compares an image captured in the imaging section at the time with an image captured before the change in images is detected; and a storage controlling section which controls whether or not to store the image captured at the time in the storage section, in accordance with a comparison result of the comparing section.

Another aspect of the present invention is directed to an image control method which stores in a storage section a captured image captured in an imaging section comprising a detecting step of detecting presence or absence of a change in images sequentially captured in the imaging section; a comparing step of, after a change in the images is detected in the detecting step and at a time when detected that a change in the images has ceased, comparing an image captured in the imaging section at the time with an image captured before the change in images is detected; and a storage controlling step of controlling whether or not to store the image captured at the time in the storage section, in accordance with a comparison result of the comparing step.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment of the present invention is described below with reference to FIG. 1 to FIG. 7.

Figure 1:
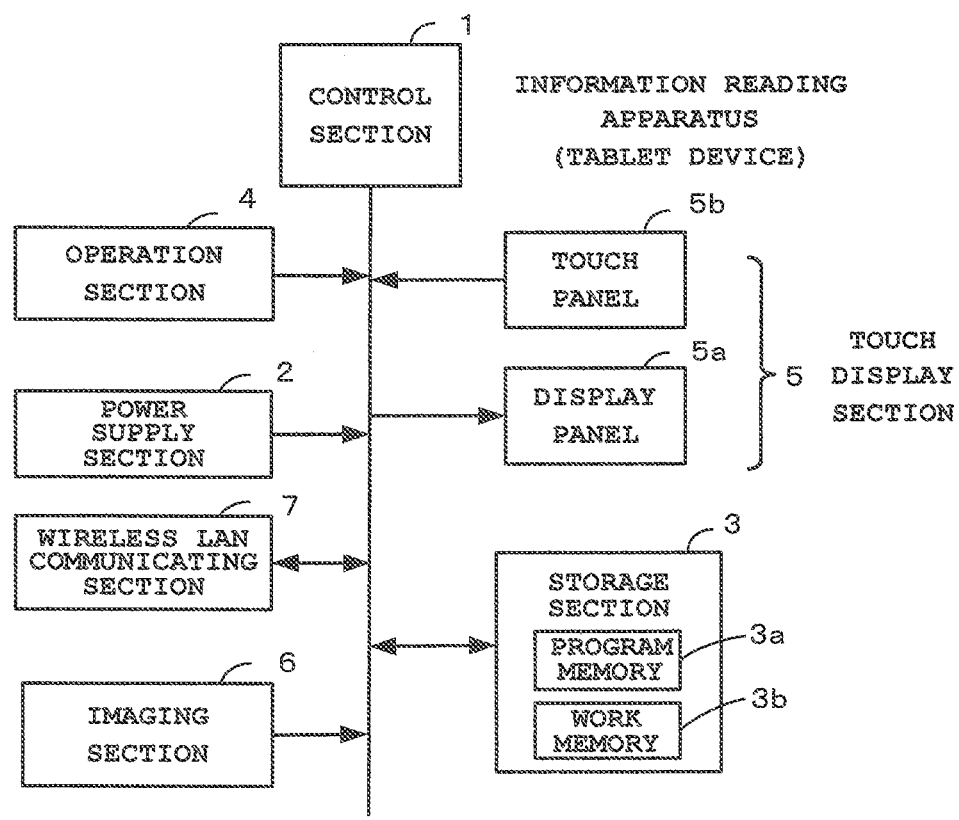
FIG. 1 is a block diagram showing basic components of an information reading apparatus of an embodiment.

FIG. 1 is a block diagram showing basic components of an information reading apparatus of an embodiment.

This information reading apparatus photographs an information recording medium having information recorded thereon (for example, a paper medium such as a document) and reads the information. A control section 1 serving as the core of the apparatus operates with power supply from a power supply section 2, and has a central processing unit which controls an entire operation of the information reading apparatus by following various programs in a storage section 3, a memory, etc.

The storage section 3 has, for example, a program memory 3a where programs depicted in flowcharts of FIG. 6 and FIG. 7 described below, various applications, etc. are stored, and a work memory 36 which temporarily stores various information required for the information reading apparatus to operate (for example, a flag).

The storage section 3 may be structured to include a recording medium such as an SD card, and may include a storage area on another server apparatus (omitted in the drawing) side.

An operation section 4 in FIG. 1 includes, although omitted in the drawing, a power supply key which is a press-button key for turning power supply ON/OFF. The control section 1 performs processing in accordance with an input operation signal corresponding to an operation key which is outputted from the operation section 4.

A touch display section 5 is structured to have a display panel 5a with a touch panel 5b laminated thereon.

An imaging section 6, which constitutes an image reading function, is a digital camera section capable of photographing a subject with high definition by forming a subject image from an optical lens onto an imaging element (such as a CCD (Charge-Coupled Device) or a CMOS (Complementary Metal-Oxide Semiconductor), and has an imaging lens, an imaging element, various sensors, an analog processing section, a digital processing section, and the like omitted in the drawing.

A wireless LAN (Local Area Network) communicating section 7 is a wireless communication module capable of high-speed large-capacity communication, and is capable of being connected to the Internet via a nearby wireless LAN router (omitted in the drawing).

Figure 2:
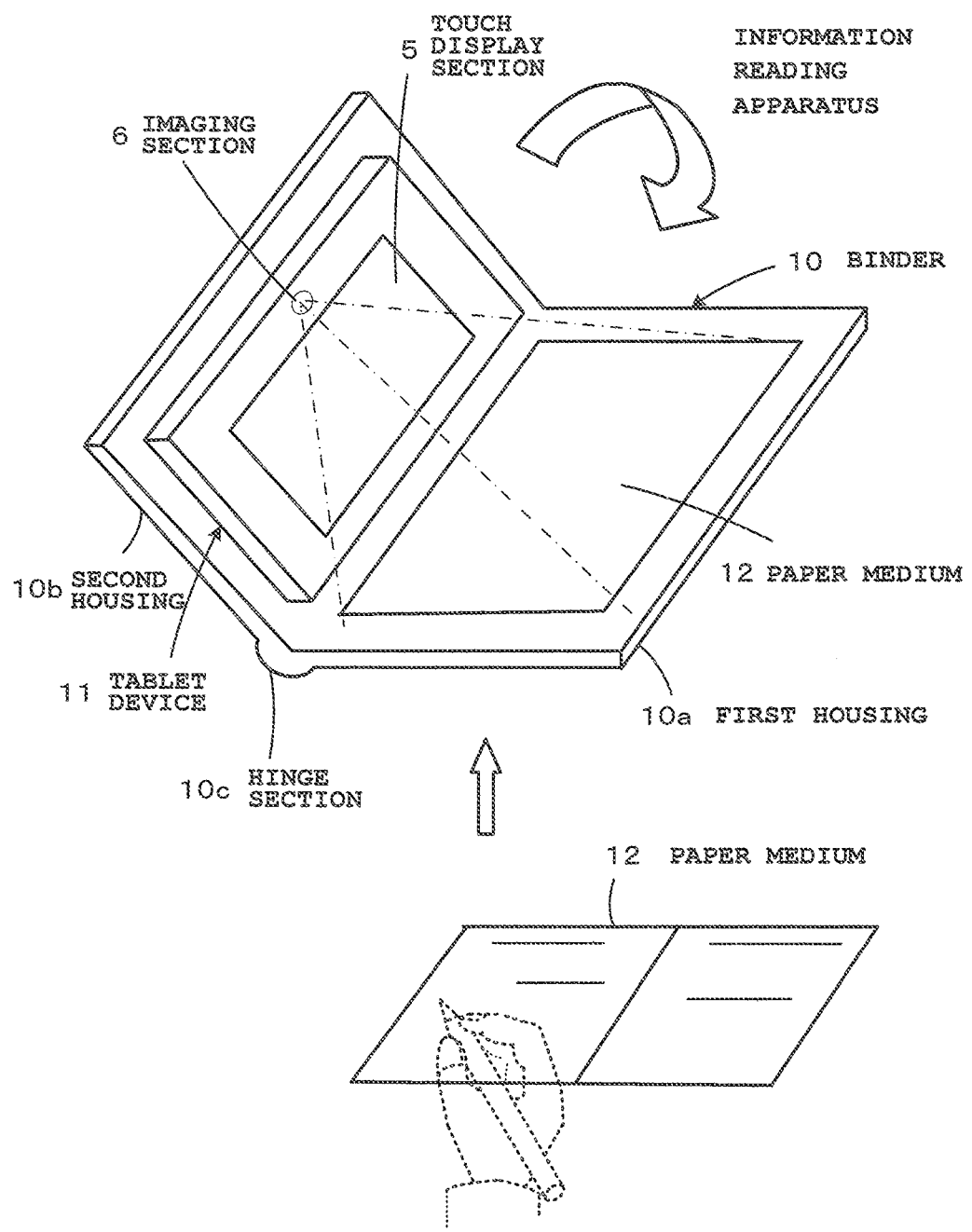
FIG. 2 is an external perspective view of the information reading apparatus, depicting a state in which a paper medium is read by the information reading apparatus.

FIG. 2 is an external perspective view of the information reading apparatus, depicting a state in which a paper medium is read by the information reading apparatus.

The information reading apparatus is structured to have a tablet device 11 and a paper medium 12 mounted on a double-open binder 10, and is basically synonymous with the tablet device 11.

The binder 10 is structured to have a first housing 10a and a second housing 10b mounted thereon via a hinge section 10c so as to be openable to be in an opened state. The first housing 10a and the second housing 10b are openable and closable from a state of being opened at 180 degrees to a state in which the second housing 10b has been placed on the first housing 10a (completely closed state).

The touch display section 5 and the imaging section 6 of the tablet device 11 are placed to be positioned on the front surface side of the tablet device 11. Also, the imaging section 6 is placed to be positioned at the center of one end on the front surface side (in the example depicted in the drawing, at the center of the left end on the front surface).

When an angle formed by the first housing 10a and the second housing 10b becomes in a predetermined angle range, the tablet device 11 obtains, as a read image, an image obtained by photographing the entire paper medium 12 mounted on the first housing 10a.

For example, in a state where the first housing 10a has been placed on the surface of a table or the like, when an angle at which the second housing 10b obliquely stands, that is, a standing angle of the second housing 10b comes within a predetermined angle range, the paper medium 12 is photographed. Specifically, when an optimum angle suitable for photographing the paper medium 12 is, for example, 70 degrees, and a standing angle of the second housing 10b comes within a photographing angle range including predetermined angles (65 degrees to 75 degrees) which are close (plus or minus 5 degrees) to the optimal angle, the paper medium 12 is photographed.

Also, conversely to the above-described case, it can be utilized such that the first housing 10a obliquely stands with the second housing 10b being placed on the surface of a desk and the like.

The paper medium 12 is a medium having information written thereon from which characters, diagrams, tables, etc. are optically read out. For example, the paper medium 12 is a notebook, a report paper sheet, or a book. However, it is not limited to materials made of paper, and may be any photographic subject having information thereon, which includes electronic paper capable of electronically displaying information.

FIG. 3A to FIG. 3D are diagrams each describing a judging method for judging whether the paper medium 12 is in a two-page spread layout.

Figure 3A:
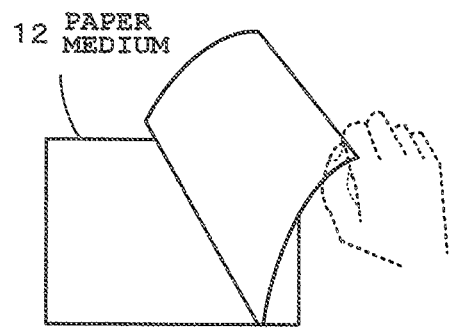
FIG. 3A to FIG. 3D each depict a diagram for describing one judging method for judging whether the paper medium is in a two-page spread layout.

FIG. 3A is a diagram depicting a state in which a page of the paper medium 12 obtained by bundling a plurality of sheets and securing the upper-right corners of these sheets with a paper clip or the like (hereinafter referred to as a one-point-secured-type document) is being turned.

In a live view image obtained by photographing this one-point-secured-type document whose one corner of the sheets has been secured and page is being turned, a change of the image at the time of page turning significantly appears in the vertical direction and the rightward direction.

Figure 3C:
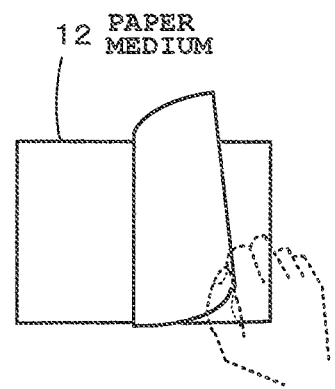
Figure 3B:
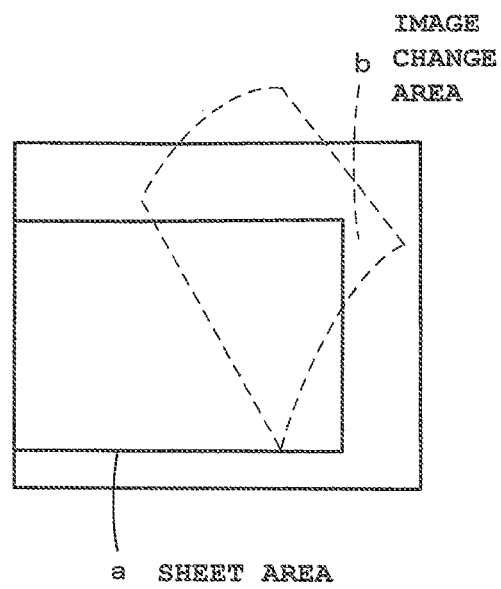

That is, as depicted in FIG. 3B, an image change area b where the image is partially straying off a sheet area a of the document by page turning (a page being turned) significantly changes in the vertical direction and the rightward direction.

FIG. 3C is a diagram depicting a state where a page of a two-page-spread-type document having left and right pages such as a notebook and serving as the paper medium 12 is being turned.

Figure 3D:
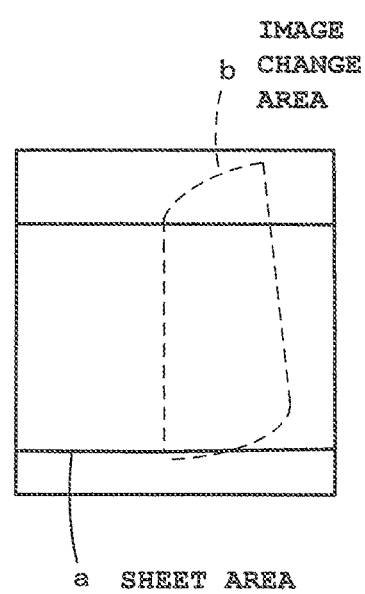

In a live view image obtained by photographing this two-page-spread-type document whose page is being turned, the image change area b where the image is partially straying off the sheet area a of the document by page turning (a page being turned) is hardly present in the horizontal direction, and is slightly large in the vertical direction, as depicted in FIG. 3D.

Thus, in the present embodiment, since a change of an image at the time of page turning varies according to the document format (the one-point-secured-type document or the two-page-spread-type document) and a change of the sheet area a in the rightward direction is significant, whether or not the image change area b is straying onto the right side of the sheet area a is used as a criterion for document format judgment.

Figure 4A:
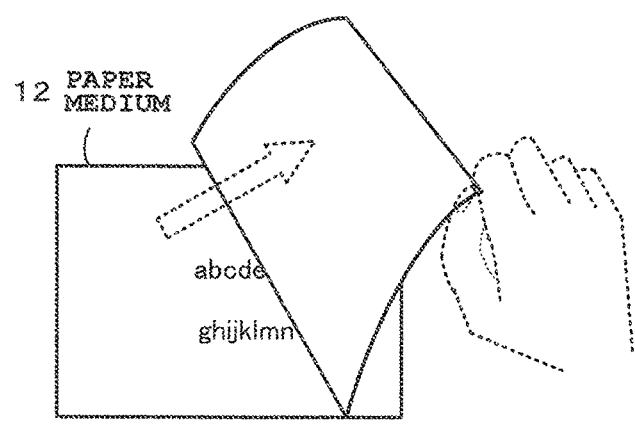
FIG. 4A and FIG. 4B each depict a diagram for describing another judging method for judging whether the paper medium is in a two-page spread layout.
Figure 4B:
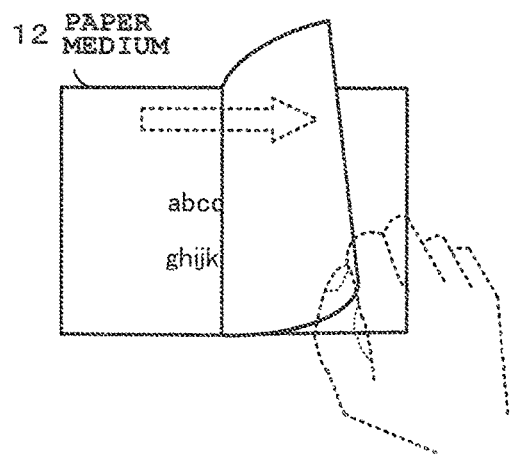

FIG. 4A and FIG. 4B are diagrams for describing another judging method for judging whether the paper medium 12 is in a two-page spread layout.

FIG. 4A is a diagram depicting a state in which a page of a one-point-secured-type document is being turned, as with FIG. 3A.

In a live view image obtained by photographing this one-point-secured-type document whose page is being turned, a change of the image at the time of page turning appears by a change of document content on the next page (subsequent page) in the diagonally upper direction (the arrow direction in the drawing).

FIG. 4B is a diagram depicting a state in which a page of a two-page-spread-type document is being turned, as with FIG. 3C. In a live view image obtained by photographing this two-page-spread-type document whose page is being turned, a change of the image at the time of page turning appears by a change of document content on the next page (subsequent page) in the horizontally-straight rightward direction (the arrow direction in the drawing).

Thus, in the present embodiment, since a changing direction of document content on a next page (subsequent page) at the time of page turning varies according to the document format, the changing direction of the document content is used as a criterion for document format judgment.

Figure 5A:
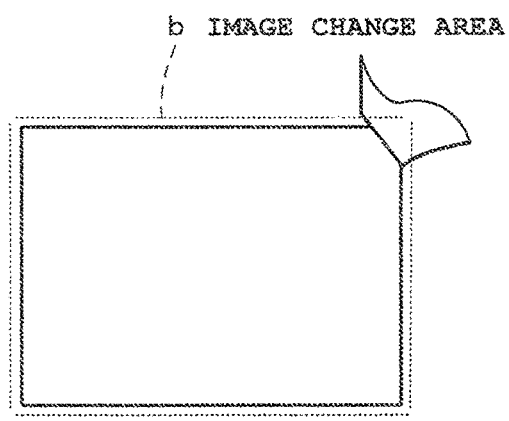
FIG. 5A and FIG. 5B each depict a diagram for describing still another judging method for judging whether the paper medium is in a two-page spread layout.
Figure 5B:
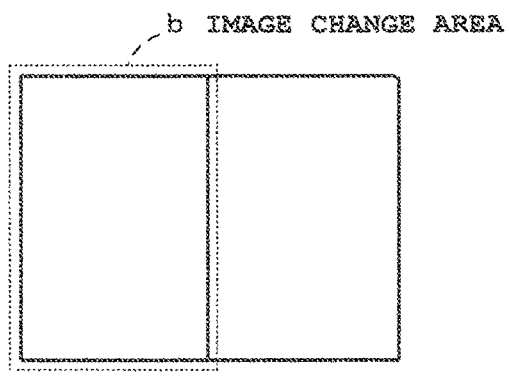

FIG. 5A and FIG. 5B are diagrams for describing still another method for judging whether the paper medium 12 is in a two-page spread layout.

FIG. 5A is a diagram depicting a state when the page turning of a one-point-secured-type document is started.

In a live view image obtained by photographing the state when the page turning of the one-point-secured-type document is started, since the entire page is slightly bent, warped, or shifted due to page turning, the image change area b where the document content is being changed is an area approximately similar to the sheet area a of the document (the area surrounded by the broken line in the drawing).

FIG. 5B is a diagram depicting a state when the page turning of a two-page-spread-type document is started.

In a live view image obtained by photographing the state when the page turning of the two-page-spread-type document is started, when the left page of the two page spread is started to be turned, the entire page is slightly bent, warped, or shifted, but this change does not occurs on the right page. Therefore, the image change area b where the document content is being changed is the left-half area of the sheet area a of the document (the area surrounded by the broken line in the drawing).

Thus, in the present embodiment, since the size of the image change area b where document content is being changed at the start of page turning with respect to the sheet area a varies according to the document format, the size of the image change area b is used as a criterion for document format judgment.

As described above, in the present embodiment, the control section 1 makes judgments according to the plurality of judgment methods, that is, the method of making a judgment based on whether the image change area b is straying onto the right side of the sheet area a, the method of making a judgment based on whether the changing direction of document content on a next page (the subsequent page) at the time of page turning is the horizontally-straight rightward direction, and the method of making a judgment based on whether the image change area b is the left-half area of the sheet area a. Here, whether or not the paper medium 12 is in a two-page spread layout is judged by judgments being sequentially made according to the plurality of judging methods in a predetermined priority order.

Next, the operation concept of the information reading apparatus of the present embodiment is described with reference to flowcharts depicted in FIG. 6 and FIG. 7.

Here, each function described in the flowcharts is stored in a readable program code format, and operations based on these program codes are sequentially performed.

Also, operations based on the above-described program codes transmitted over a transmission medium such as a network can also be sequentially performed.

That is, the unique operations of the present embodiment can be performed using programs and data supplied from an outside source over a transmission medium, in addition to a recording medium.

Figure 6:
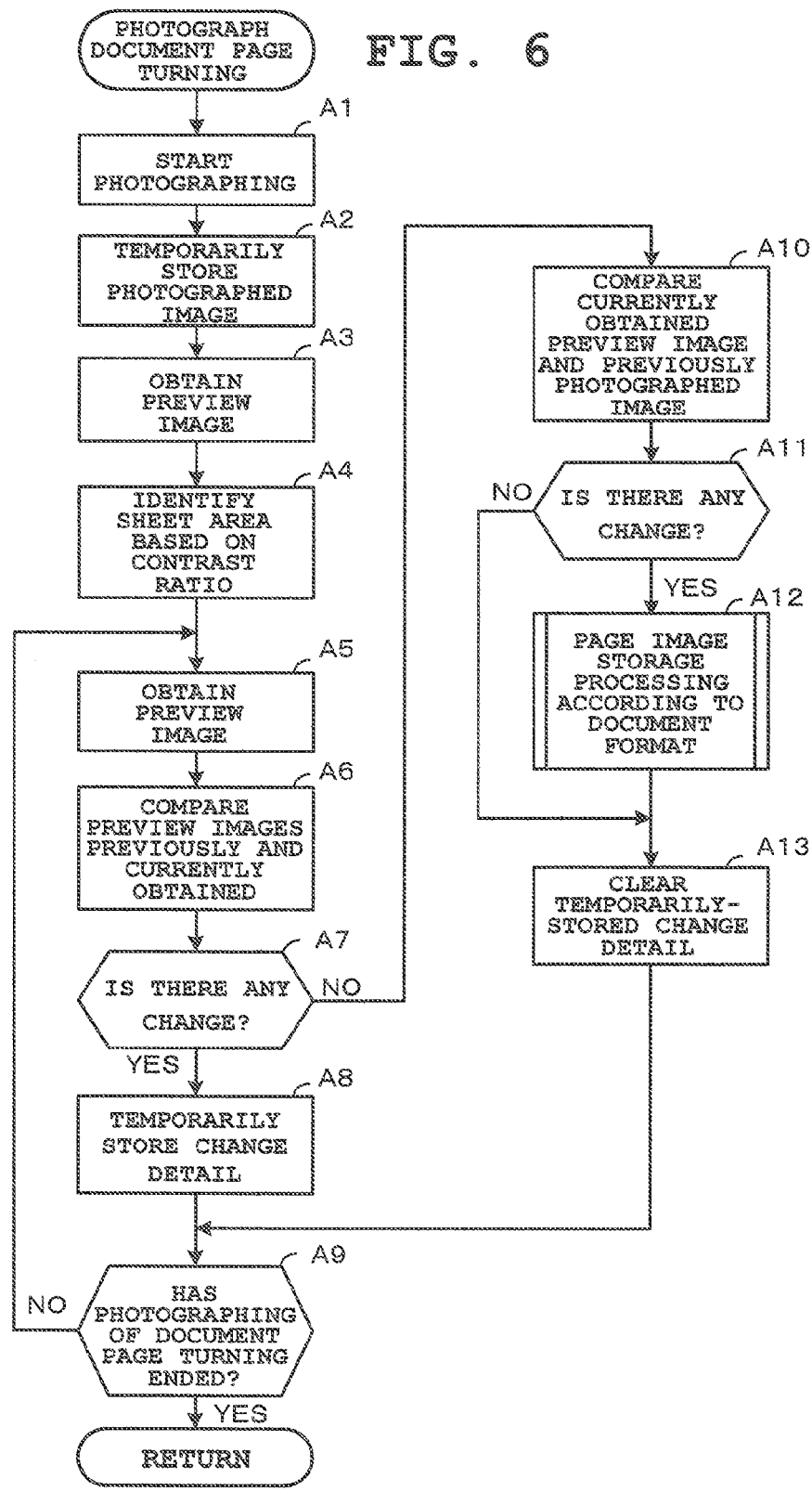
FIG. 6 is a flowchart for describing an operation (a characteristic operation of the present embodiment) that is started when a document page-turning photographing mode is specified in response to the switching of an operation mode by a user operation.
Figure 7:
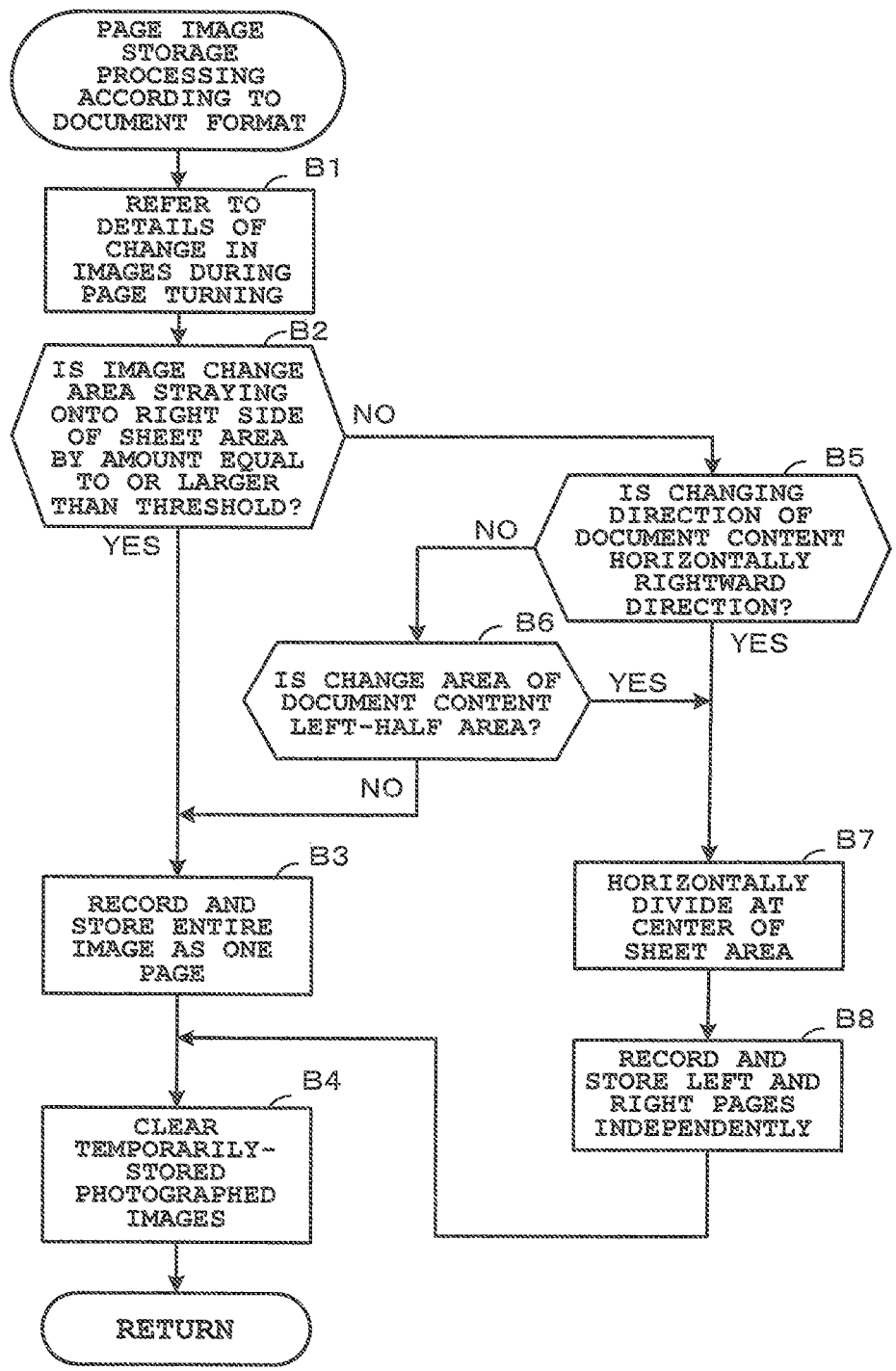
FIG. 7 is a flowchart for describing processing for storing a page image according to a document format (Step A12 of FIG. 6) in detail.

Note that these flowcharts in FIG. 6 and FIG. 7 outline operations of the characteristic portion of the present embodiment from among all of the operations of the information reading apparatus. After exiting the flows in FIG. 6 and FIG. 7, the procedure returns to the main flow (not shown) of the overall operation.

FIG. 6 is a flowchart for describing an operation (characteristic operation of the embodiment of the present invention) that is started when a document page-turning photographing mode is specified in response to the switching of an operation mode by a user operation.

First, the control section 1 activates the imaging section 6 in response to the switching of the current mode to a document page-turning photographing mode so as to start a photographing operation (Step A1), obtains a photographed image from the imaging section 6, and temporarily stores the image in the work memory 3b (Step A2).

Then, the control section 1 obtains the photographed image as a preview (live view) image (Step A3), and identifies the sheet area a of the document while detecting a contrast ratio and detecting a rectangular area by analyzing this preview image (Step A4).

Then, the control section 1 obtains another preview image from the imaging section 6 (Step A5), compares the previously-obtained preview image and the currently-obtained preview image (Step A6), and thereby judges whether there is a change in the image content (Step A7). When a change is detected in the images (YES at Step A7), the control section 1 judges that the page is being turned, and temporarily stores the change detail in the work memory (Step A8).

Next, the control section 1 judges whether or not the document page-turning photographing mode has been released and an instruction for ending the photographing has been provided (Step A9). When the current mode is still the document page-turning photographing mode (NO at Step A9), the control section 1 returns to Step A5 above and obtains a preview image from the imaging section 6. Hereafter, the control section 1 repeats an operation of temporarily storing a change detail every time a change in images is detected (until the page turning is over) (Step A5 to Step A8).

When a change in the images is not detected (NO at Step A7), the control section 1 judges that the page turning is over, and proceeds to Step A10. Then, the control section 1 reads out the photographed image temporarily stored in the work memory 3*b* as a previously photographed image, compares the currently obtained preview image and the previously photographed image, and judges whether there is a change in the image content (Step A11).

When there is no change in the image content (NO at Step A11), the control section 1 judges that there is not a change due to page turning in the images, and proceeds to Step A13. Then, the control section 1 performs processing for clearing the change detail temporarily stored in the work memory 3*b*, returns to Step A9, and judges whether the document page-turning photographing mode has been released.

On the other hand, when a change of the image content is detected as a result of the currently-obtained preview image being compared with the previously photographed image (YES at Step A11), the control section 1 judges that there is a change due to page turning in the images, and proceeds to processing for storing a page image according to a document format (Step A12).

Then, after performing processing for clearing the temporarily stored change detail (Step A13), the control section 1 returns to Step A9, and judges whether the document page-turning photographing mode has been released.

FIG. 7 is a flowchart for describing the processing for storing a page image according to a document format (Step A12 of FIG. 6) in detail.

First, the control section 1 refers to the work memory 3*b* where details of a change in images at the time of read page turning are sequentially stored (Step B1) so as to analyze the change state in the images, and thereby judges whether an area in the images (the page being turned), that is, the image change area b is straying onto the right side of the sheet area a of the document by an amount equal to or larger than a predetermined threshold, as depicted in FIG. 3A and FIG. 3B (Step B2).

When the image change area b is straying onto the right side of the sheet area a by an amount equal to or larger than the threshold (YES at Step B2), as depicted in FIG. 3A and FIG. 3B, the control section 1 judges that a page of a one-point-secured-type document is being turned, and records and stores the entire photographed image as one-image-per-page data (Step B3).

Then, after clearing the photographed images temporarily stored in the work memory 3*b* (Step B4), the control section 1 exits the flow of FIG. 7.

On the other hand, when the image change area b is not significantly straying onto the right side of the sheet area a (NO at Step B2), the control section 1 judges that there is a possibility that a page of a two-page-spread-type document is being turned, and judges whether the changing direction of the document content is a horizontally-straight rightward direction (Step B5), as depicted in FIG. 4B.

When the changing direction is not a horizontally-straight rightward direction (NO at Step B5), the control section 1 judges that there is a possibility that a page of a one-point-secured-type document is being turned, and judges whether the change area of the document content is the left-half area of the sheet area a (Step B6).

When the changing direction is not a horizontally-straight rightward direction (NO at Step B5) and the image change area b is not the left-half area of the sheet area a (NO at Step B6), the control section 1 judges that a page of a one-point-secured-type document is being turned, and proceeds to processing for recording and storing the entire photographed image as data of one page (Step B3).

On the other hand, when the changing direction is a horizontally-straight rightward direction (YES at Step B5) or the image change area b is the left-half area of the sheet area a (YES at Step B6), the control section 1 judges that a page of two-page-spread-type document is being turned, and performs processing for dividing the sheet area a into left and right pages with the center line in the longitudinal direction as a boundary (Step B7).

With left and right areas obtained by this bisection as independent left and right pages, the control section 1 causes the left page and the right page to be independently stored and recorded (Step B8).

Then, after clearing the photographed images temporarily stored in the work memory 3*b* (Step B4), the control section 1 exits this flow of FIG. 7.

As described above, in the present embodiment, the control section 1 analyzes a photographed image obtained by photographing an entire document serving as the paper medium (information recording medium) 12 by the imaging section 6, and thereby judges whether the paper medium 12 is in a two-page spread layout. When the paper medium 12 is in a two-page spread layout, the photographed image is divided into the pages of a two-page spread. As a result of this configuration, even when the entire paper medium 12 in a two-page spread layout is photographed at one time, one page can be processed as one image. This can save a bothersome editing work of dividing a photographed image of a two-page spread by a user operation, and can efficiently process continuously-photographed images of a book or the like for each page.

Also, the control section 1 compares images sequentially photographed when a page of the paper medium 12 is being turned, detects a change of the image content, and judges whether the paper medium 12 is in a two-page spread layout based on the change of the image content. As a result of this configuration, whether the paper medium 12 is in a two-page spread layout can be judged from the status of page turning.

Moreover, the control section 1 compares images sequentially photographed at the time of page turning, detects an area straying in a page-turning direction of the paper medium 12 as a change of the image content, and judges whether the paper medium 12 is in a two-page spread layout based on the stray area. As a result of this configuration, a two-page spread can be accurately and stably judged from the status of page turning.

Furthermore, the control section 1 judges that the paper medium 12 is in a two-page spread layout when the size of an area straying in the page-turning direction of the paper medium 12 is larger than a predetermined value. As a result of this configuration, a two-page spread can be further accurately judged.

Still further, the control section 1 compares images sequentially photographed at the time of page turning, detects whether there is a change in the page-turning direction as a change of the image content, and judges whether the paper medium 12 is in a two-page spread layout based on whether there is a change in the page-turning direction. As a result of this configuration, a two-page spread can always be accurately and stably judged from the status of page turning.

Yet still further, the control section 1 compares images sequentially photographed at the time of page turning, detects whether a change during the page turning has occurred in a substantially entire area or a substantially half area of the paper medium 12, and judges whether the paper medium 12 is in a two-page spread layout based on the size of the change area. As a result of this configuration, a two-page spread can always be accurately and stably judged from the status of page turning.

Yet still further, the control section 1 sequentially makes judgments according to the plurality of judging methods in the predetermined priority order to judge whether the paper medium 12 is in a two-page spread layout. As a result of this configuration, a double-page spread can be further accurately judged.

Yet still further, the control section 1 divides a photographed image into two, that is, left and right pages with the center as a boundary along a folding portion (longitudinal center line) L1 between pages. As a result of this configuration, right and left pages can be accurately obtained from a two-page spread.

Figure 8:
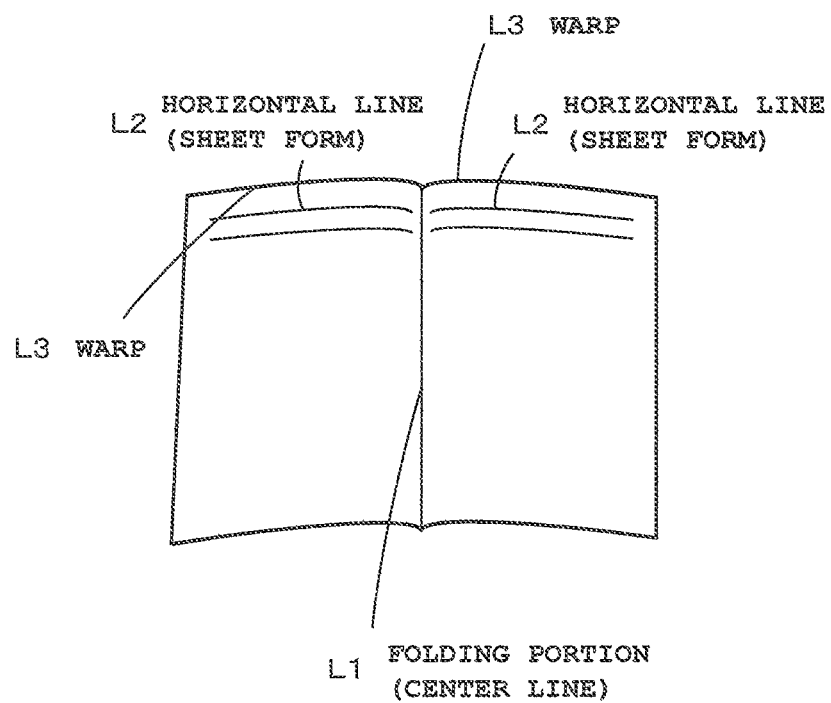
FIG. 8 is a diagram for describing a modification example of the present embodiment.

In the above-described embodiment, the plurality of judgment methods include, for example, the method of making a judgment based on whether the image change area b is straying onto the right side of the sheet area a, the method of making a judgment based on whether the changing direction of the document content of a next page (subsequent page) at the time of page turning is a horizontally-straight rightward direction, and the method of making a judgment based on whether the image change area b is the left-half area of the sheet area a. However, the present invention is not limited thereto. For example, the judging method depicted in FIG. 8 may be used.

That is, in the above-described embodiment, whether the paper medium 12 is in a two-page spread layout is judged based on the status of page turning. However, a configuration may be adopted in which a photographed image of the paper medium 12 is analyzed to detect the form and the warping status of the paper medium 12 and whether the paper medium 12 is in a two-page spread layout is judged based on the detected form and warping status.

For example, a configuration may be adopted in which the paper medium 12 is judged to be in a two-page spread layout based on the fact that the folding portion (longitudinal center line) L1 between pages in a two-page spread is present, the fact that the layout (sheet form) is such that a horizontal line L2 is horizontally symmetrical with respect to the folding portion (longitudinal center line) L1, or the fact that a horizontally symmetrical warp L3 with respect to the folding portion (longitudinal center line) L1 is present. As a result of this configuration, a two-page spread can be judged even without page turning.

Also, in the above-described embodiment, when the paper medium 12 is judged to be in a two-page spread layout, the photographed image is divided into the pages of the two-page spread. However, in addition, the photographed image may be analyzed to further judge the orientation of the paper medium 12 and perform rotation control so that the orientation of each page data obtained by the division coincides with the orientation of the paper medium 12.

Figure 9A:
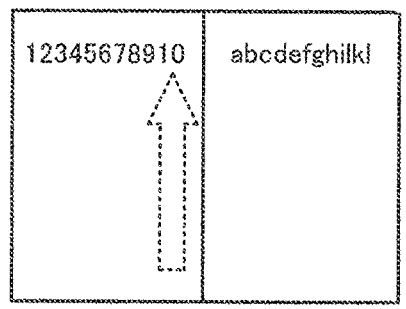
FIG. 9A and FIG. 9B each depict a diagram for describing another modification example of the present embodiment.
Figure 9B:
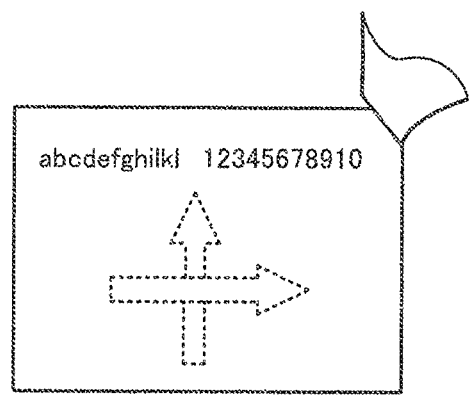

In this case, since there is a high possibility that the upper portion of the image of a two-page-spread-type document corresponds to the upper portions of the sheets as depicted in FIG. 9A and the upper or right portion of the image of a one-point-secured-type document whose upper-right corners of the sheets have been secured corresponds to the upper portions of the sheets as depicted in FIG. 9B, the orientation of sheets can be judged together with the document format.

As a result of this configuration, for example, the entire processing efficiency can be improved as compared with a method of using a character recognition function to judge an orientation of the sheet from a character direction.

Moreover, in the above-described embodiment, judgments as to whether the paper medium 12 is in a two-page spread layout are sequentially made according to the plurality of judging methods in the predetermined priority order. However, a configuration may be adopted in which, when a desired judging method is selected by a user operation, this judging method is used to judge whether the paper medium 12 is in a two-page spread layout. By using this configuration where a judging method can be selected, even unique page turning can be supported, and a judgment can be accurately made.

Furthermore, in the above-described embodiment, a judgment is made according to whether the image change area b is straying onto the right side of the sheet area a. However, a configuration may be adopted in which a judgment is made according to whether the image change area b is straying onto the right side and the upper side of the sheet area a.

Still further, in the above-described embodiment, when the image change area b is not straying onto the right side of the sheet area a by an amount equal to or larger than the threshold, it is judged that there is a possibility that a page of a two-page-spread-type document is being turned, and it is judged whether the changing direction of the document content is a horizontally-straight rightward direction or whether the change area of the document content is the left-half area of the sheet area a. However, how these methods are combined for judgment may be arbitrarily changed.

Also, a configuration may be adopted in which a two-page spread is judged when all conditions of the plurality of judging methods are satisfied, or a configuration may be adopted in which a two-page spread is judged when at least one of the conditions of the plurality of judging methods is satisfied.

Yet still further, in the above-described embodiment, a photographed image is divided into left and right pages at the center of the sheet. However, a configuration may be adopted in which a photographed image is divided into upper and lower pages at the center of the sheet area. In addition, the number of the division is not limited to two. For example, the number of the division may be three, as long as the division is on a page basis.

Yet still further, in the above-described embodiment, a one-point-secured-type document obtained by bundling a plurality of sheets and securing the upper-right corners of these sheets with a clip or the like is exemplarily described. However, the position to be secured with a clip or the like is not limited to the upper-right corner of the sheet, and may be the upper-left corner or the center upper-end portion.

Yet still further, in the above-described embodiment, a photographed image is divided into left and right pages at the center of the sheet and these left and right pages are each recorded and stored. However, a configuration may be adopted in which, in the case of a two-page-spread-type document, when only one page is a printed page or a hand-written page and the other page is blank, the blank page is excluded and only the printed or hand-written page is extracted to be recorded and stored.

Yet still further, in the above-described embodiment, the information reading apparatus is structured such that the tablet device 11 and the paper medium 12 are mounted on the double-open binder 10. However, the present invention is not limited thereto, and the structure may be arbitrarily determined. For example, a structure may be adopted in which the imaging section is mounted on a support pole or the like to photograph the paper medium 12 from diagonally above.

Yet still further, in the above-described embodiment, the tablet device 11 is described as an information reading apparatus of the present invention. However, the present invention is not limited thereto, and the information reading apparatus may be, for example, a personal computer, PDA (Personal Digital Assistant), or smartphone equipped with a camera, or a digital camera.

Yet still further, the "devices" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An image control apparatus which stores in a storage section an image of a document captured in an imaging section, comprising:
    a comparing section which, after changing from a first static image in which an imaging subject is not in motion into a dynamic image in which the imaging subject is in motion and at a time when changing from the dynamic image into a second static image in which an imaging subject is not in motion, compares the first static image and the second static image; and
    a storage controlling section which controls whether or not to store the second static image in the storage section, in accordance with a comparison result of the comparing section,
    wherein the storage controlling section judges whether the document is a page of a one-point-secured-type document or a page of a two-page-spread-type document based on the image of the document captured in the imaging section, stores a page image of the document according to a judged document type.

2. An image control apparatus which stores in a storage section an image of a document captured in an imaging section, comprising:
    a detecting section which detects presence or absence of a change in images of the document sequentially captured in the imaging section;
    a comparing section which, after a change in the images of the document is detected in the detecting section and at a time when detected that a change in the images of the document has ceased, compares an image of the document captured in the imaging section at the time with an image of the document captured before the change in images of the document is detected; and
    a storage controlling section which controls whether or not to store the image of the document captured at the time in the storage section, in accordance with a comparison result of the comparing section,
    wherein the storage controlling section judges whether the document is a page of a one-point-secured-type document or a page of a two-page-spread-type document based on the image of the document captured in the imaging section, stores a page image of the document according to a judged document type.

3. The image control apparatus according to claim 2, wherein the detecting section temporarily stores an image captured in the imaging section, and compares an image newly captured in the imaging section with the temporarily stored image, thereby detecting the change in images.

4. The image control apparatus according to claim 2, wherein the comparing section compares the image captured at a time when detected that a change in the images has ceased with a preceding image stored in the storage section immediately before the change in images is detected.

5. The image control apparatus according to claim 1, wherein the storage controlling section controls such that, when the images compared in the comparing section are different, the image captured at the time is stored in the storage section, and, when the images compared in the comparing section are not different, the image captured at the time is not stored in the storage section.

6. The image control apparatus according to claim 1, wherein the storage controlling section judges whether the image captured in the imaging section is a two-page spread document image and, when the captured image is a two-page spread document image, divided a two-page spread image into respective images of two pages included in the captured image and stores the respective images.

7. An image control method which stores in a storage section an image of a document captured in an imaging section comprising:
    a detecting step of detecting presence or absence of a change in images of the document sequentially captured in the imaging section;
    a comparing step of, after a change in the images of the document is detected in the detecting step and at a time when detected that a change in the images of the document has ceased, comparing an image of the document captured in the imaging section at the time with an image of the document captured before the change in images of the document is detected; and
    a storage controlling step of controlling whether or not to store the image of the document captured at the time in the storage section, in accordance with a comparison result of the comparing step,
    wherein the storage controlling step judges whether the document is a page of a one-point-secured-type document or a page of a two-page-spread-type document based on the image of the document captured in the imaging section, stores a page image of the document according to a judged document type.

* * * * *